United States Patent
Kircher et al.

(10) Patent No.: US 10,227,126 B2
(45) Date of Patent: Mar. 12, 2019

(54) CEILING TRIM ELEMENT FOR AN INTERIOR TRIM ARRANGEMENT OF AN AIRCRAFT CABIN

(71) Applicant: Airbus Operations GmbH, Hamburg (DE)

(72) Inventors: Benedikt Kircher, Hamburg (DE); Paul Edwards, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 198 days.

(21) Appl. No.: 14/619,723

(22) Filed: Feb. 11, 2015

(65) Prior Publication Data

US 2015/0232168 A1    Aug. 20, 2015

(30) Foreign Application Priority Data

Feb. 14, 2014  (DE) .................. 10 2014 202 774

(51) Int. Cl.
*B64C 1/06* (2006.01)
*B64D 11/00* (2006.01)
*B64D 47/02* (2006.01)
*F21V 3/04* (2018.01)
*F21W 107/30* (2018.01)

(52) U.S. Cl.
CPC .............. *B64C 1/066* (2013.01); *B64D 11/00* (2013.01); *B64D 47/02* (2013.01); *F21V 3/049* (2013.01); *B64D 2011/0038* (2013.01); *F21W 2107/30* (2018.01)

(58) Field of Classification Search
CPC .......... B64C 1/066; B64D 47/02; F21V 21/00
See application file for complete search history.

(56) References Cited

U.S. PATENT DOCUMENTS

| | | | | |
|---|---|---|---|---|
| 4,772,986 A | * | 9/1988 | McNemor | G01D 11/28 362/23.16 |
| 4,893,222 A | * | 1/1990 | Mintzer | F21V 33/0052 211/26.1 |
| 5,217,295 A | * | 6/1993 | Tortola | A63F 13/02 273/148 B |

(Continued)

FOREIGN PATENT DOCUMENTS

| | | |
|---|---|---|
| DE | 10 2004/031700 A1 | 1/2006 |
| DE | 10 2007/001702 A1 | 7/2008 |

OTHER PUBLICATIONS

Search Report for German Application No. 10 2014 202 774.8 dated Nov. 3, 2014.

*Primary Examiner* — Michael H Wang
(74) *Attorney, Agent, or Firm* — Jenkins, Wilson, Taylor & Hunt, P.A.

(57) ABSTRACT

A ceiling trim element for a passenger cabin of a vehicle, in particular for an aircraft cabin of an aircraft which has a planar panel element with a front side and a rear side, wherein the front side is provided to point towards the interior of the passenger cabin, and the rear side is provided to point away from the interior of the passenger cabin, wherein an image surface is provided in the panel element, wherein the image surface is assigned a varying pattern generator in order to illuminate the image surface with varying patterns, and having an illuminating ring generator to generate an illuminating ring which surrounds the image surface.

12 Claims, 3 Drawing Sheets

(56) References Cited

U.S. PATENT DOCUMENTS

| | | | | |
|---|---|---|---|---|
| 5,229,910 A * | 7/1993 | Kasahara | G09F 7/12 | |
| | | | 296/21 | |
| 6,446,925 B1 * | 9/2002 | Wada | B64D 11/0015 | |
| | | | 248/286.1 | |
| 6,633,286 B1 * | 10/2003 | Do | B64D 11/0015 | |
| | | | 345/204 | |
| 7,380,752 B2 * | 6/2008 | Guard | B64C 1/066 | |
| | | | 244/118.5 | |
| 7,880,636 B2 * | 2/2011 | Heym | B64D 11/0015 | |
| | | | 340/691.1 | |
| 8,322,880 B2 * | 12/2012 | Vogel | B60Q 3/025 | |
| | | | 362/246 | |
| 9,452,836 B2 * | 9/2016 | Mariat | B64C 1/18 | |
| 9,701,423 B2 * | 7/2017 | Kircher | B60Q 3/43 | |
| 2003/0123258 A1 * | 7/2003 | Nitto | G02B 6/0068 | |
| | | | 362/373 | |
| 2004/0227812 A1 * | 11/2004 | Blair | H04N 7/18 | |
| | | | 348/61 | |
| 2005/0135093 A1 * | 6/2005 | Alexanderson | B60Q 3/025 | |
| | | | 362/227 | |
| 2006/0114683 A1 * | 6/2006 | Heym | B64D 11/00 | |
| | | | 362/471 | |
| 2009/0184905 A1 * | 7/2009 | Dai | G09G 3/20 | |
| | | | 345/82 | |
| 2010/0014009 A1 * | 1/2010 | Stavaeus | B64D 11/0015 | |
| | | | 348/837 | |
| 2011/0018462 A1 * | 1/2011 | Lowe | F21V 23/04 | |
| | | | 315/294 | |
| 2011/0051019 A1 * | 3/2011 | Hardacker | H04N 5/64 | |
| | | | 348/739 | |
| 2012/0156420 A1 * | 6/2012 | Greiner | B64C 1/066 | |
| | | | 428/101 | |
| 2012/0224382 A1 * | 9/2012 | Petersohn | B60Q 3/025 | |
| | | | 362/471 | |
| 2015/0151850 A1 * | 6/2015 | Eakins | B64D 47/02 | |
| | | | 362/471 | |
| 2016/0091173 A1 * | 3/2016 | Camp, III | F21V 13/04 | |
| | | | 362/242 | |

* cited by examiner

CEILING TRIM ELEMENT FOR AN INTERIOR TRIM ARRANGEMENT OF AN AIRCRAFT CABIN

CROSS-REFERENCE TO RELATED APPLICATION

This application claims priority to German Patent Application No. 10 2014 202 774.8 filed Feb. 14, 2014, the entire disclosure of which is incorporated by reference herein.

TECHNICAL FIELD

The subject matter disclosed herein relates to a ceiling trim element, in particular for an aircraft cabin, which extends linearly along a cabin axis.

BACKGROUND

Ceiling trim elements for interior trim arrangements of an aircraft cabin are sufficiently known from the prior art. The interior trim arrangement separates off the interior of the aircraft cabin from the outer skin of the aircraft fuselage, and the interior trim arrangement therefore forms the outer wall of the cabin. An intermediate space into which reinforcement elements of the outer skin such as frames extend, is formed between the interior trim arrangement and the outer skin. It is desirable here that the elements which form the interior trim arrangement are mounted as close as possible to the outer skin in order to provide a cabin interior which is as large as possible. The ceiling trim elements then serve to form that part of the interior trim arrangement which points upwards and therefore forms the ceiling region. Above the ceiling trim elements a multiplicity of systems and supply devices for the aircraft cabin are in fact provided, and furthermore the space available there is limited by load-bearing parts of the fuselage. However, lighting devices must also be provided on the ceiling trim elements in order to illuminate the aircraft cabin. Owing to the small amount of available space there are considerable restrictions with respect to the possibilities for providing complex lighting arrangements on the ceiling trim elements.

On the other hand, from aesthetic points of view it is desirable to provide in particular the upwardly pointing part of the interior trim arrangement with relatively complex lighting arrangements. In this context it is, in particular, desirable to avoid passengers being given the impression that the height of the aircraft cabin is comparatively small. On the contrary, there is an intention instead to give an impression that the cabin is also very roomy in the upward direction. Sufficient allowance was not made for these desires in previous concepts for interior trim arrangements which are known from the prior art.

SUMMARY

Taking the prior art as a starting point, an object of the subject matter disclosed herein is therefore to make available a ceiling trim element whose lighting devices are configured in such a way that they permit complex lighting scenarios.

According to the subject matter disclosed herein, this object is achieved by a ceiling trim element for a passenger cabin of a vehicle, in particular for an aircraft cabin of an aircraft, which has a planar panel element with a front side and a rear side, wherein the front side is provided to point towards the interior of the passenger cabin, and the rear side is provided to point away from the interior of the passenger cabin, wherein an image surface is provided in the panel element, wherein the image surface is assigned means in order to illuminate the image surface with varying patterns, such as a varying pattern generator to illuminate the image surface with varying patterns, and having an illuminating ring generator configured to generate an illuminating ring which surrounds the image surface.

The image surface and the generator for generating varying patterns may be embodied, for example, together as an LCD or LED monitor. However, it is also conceivable for the image surface to be embodied as a translucent projection surface, and for a projector which is oriented towards the projection surface to be provided, with which projector the projection surface is illuminated. At any rate, a multiplicity of random patterns, that is to say for example static or moving images, can be represented on the image surface, and the space located below can therefore be illuminated in a complex way which can be varied as desired.

In the arrangement according to the subject matter disclosed herein, in which, for example, a homogenously illuminating ring, i.e. a ring which illuminates uniformly over the entire ring, is generated around a monitor in the ceiling trim element, passengers who are standing under the ceiling trim element are given the impression that the monitor is at a significantly larger distance from the panel element than is actually the case. This gives the passenger the impression that the regions with the monitor are significantly higher, with the result that the cabin appears to be significantly larger to the passenger. Furthermore, by using the image surface in the region of the ceiling trim element it is possible to generate moving or even varying patterns, which is also aesthetically particularly valuable. The same effect is achieved, for example, in the case of a translucent projection surface which is illuminated by a projector and which is also surrounded by an illuminating ring.

According to one preferred embodiment, a recess is provided in the panel element, wherein the image surface, which is oriented towards the recess, is provided on a same side of the panel element as the rear side of the panel element. In this case, the image surface is set back with respect to the surface of the panel element pointing towards the interior of the aircraft cabin, which reinforces the impression of the image surface being located at a relatively large height. However, it is also conceivable that the image surface extends in the plane of the surface of the panel element, which plane points towards the interior of the cabin.

According to one preferred embodiment, the lighting element which is provided around the recess has a multiplicity of lighting sources which are arranged distributed around the circumference of the recess. This permits uniform illumination around the circumference of the recess from below to be achieved.

In a further preferred fashion, the lighting element can have a diffuser which is embodied in an annular shape and surrounds the recess completely. If light is then irradiated into the diffuser, a uniformly illuminated ring is generated underneath the image surface along the circumference of the recess. Furthermore, the diffuser can be connected directly to the panel element and thereby increase the strength of the panel element.

It is further preferred here if a multiplicity of lighting sources are arranged on the outer circumferential surface of the diffuser, pointing away from the recess, the lighting sources being able to radiate into the diffuser and in the process generate scattered light in the diffuser, which in turn also illuminates the edge of the image surface.

However, it is also conceivable that cutouts are provided in a distributed manner around the recess in the diffuser itself, in which cutouts lighting sources, which then ensure that the scattered light is produced in the diffuser, are arranged.

In addition, on the one hand it is possible that the diffuser is embodied as an annular element which is arranged on the rear side of the panel between the panel element and the image surface. The lighting sources and a mount can then be easily mounted on the rear side of the panel element without being visible or being recognizable as individual lighting sources.

In an alternative embodiment, the diffuser which is embodied in an annular shape can, on the other hand, also be arranged inside the recess, with the result that the outer circumference of the diffuser directly adjoins the wall of the recess, and the diffuser therefore extends in the plane of the panel element.

Instead of a diffuser, it is, however, also conceivable that the edge region of the panel element is inclined adjacent to the recess towards the rear side, and therefore towards the monitor. Lighting sources can then be arranged above the inclined region without being visible to passengers, wherein the lighting elements emit light towards the image surface, with the result that the illuminating ring is generated on the surface of the image surface, at the edge thereof, wherein in a further preferred embodiment here the image surface can be provided with a matt coating in the region of its edge. Such an arrangement can be comparatively easily manufactured and has few additional elements, with the result that such an arrangement is very economical in terms of weight.

Finally, the ceiling trim element can have, adjacent to the recess or to the image surface, a projector which is arranged on the rear side of the panel element.

In this context, the concept of providing a projector in the ceiling trim element constitutes an independent inventive concept which can also be applied alone, without being combined with a monitor mounted above a recess, in a ceiling trim element.

The projector makes it possible for wall elements of monuments provided in the central region of the aircraft cabin, such as galley units or cupboards, to be irradiated with the projector with the result that complex patterns or even information for passengers can be projected onto these wall elements. Arranging the projector in the ceiling region avoids to a large extent a situation in which passengers can enter the beam path between the projector and the wall element and therefore disrupt the projection of the patterns onto the wall element.

In addition, the afore-mentioned object is achieved by an aircraft cabin arrangement, which extends rectilinearly along a cabin axis, having an interior trim arrangement which is configured to form the outer wall of the aircraft cabin arrangement, at least in certain sections, wherein the interior trim arrangement has a lateral ceiling element, a central ceiling element and a ceiling panel element, wherein the central ceiling element is embodied in a way described above, wherein the lateral ceiling element, the central ceiling element and the ceiling panel element are part of a section of the outer wall which bounds the aircraft cabin in the upward direction, wherein the lateral ceiling element, the central ceiling element and the ceiling panel element are arranged adjacent to one another transversely with respect to the cabin axis in such a way that the lateral ceiling element is arranged closest to a lateral section, bounding the aircraft cabin in the lateral direction of the cabin axis, of the outer wall, that the central ceiling element is arranged on the side of the lateral ceiling element facing away from the lateral section, and that the ceiling panel element is arranged on the side of the central ceiling element facing away from the lateral ceiling element.

In such an aircraft cabin arrangement, the ceiling trim element according to the subject matter disclosed herein can be arranged, in particular as a central ceiling element, vertically above an aisle, extending parallel to the cabin axis, between rows of seats, wherein the advantage is then obtained that particularly the passengers in the aisle are given the impression of a large height of the cabin.

In the text which follows, the subject matter disclosed herein will be explained on the basis of a drawing which shows only preferred exemplary embodiments, wherein:

DETAILED DESCRIPTION

Figure 1:
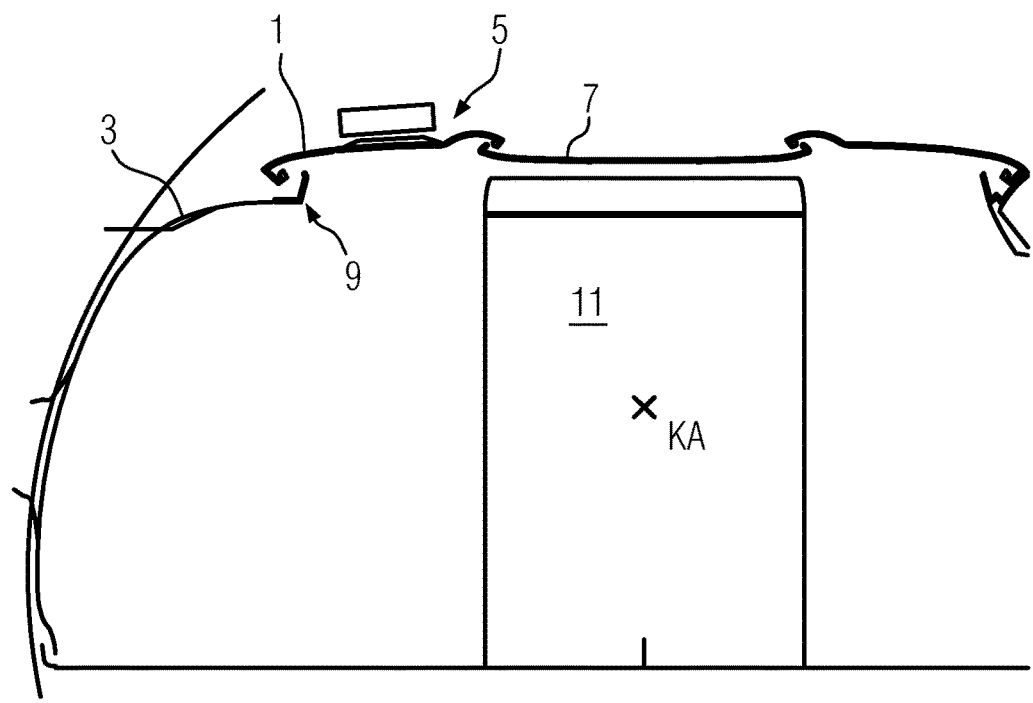
FIG. 1 shows a cross section through an aircraft cabin with an exemplary embodiment of a ceiling trim element according to the subject matter disclosed herein.

FIG. 1 shows an inventive aircraft cabin arrangement having an interior trim arrangement in cross section, wherein the aircraft cabin arrangement extends rectilinearly along a cabin axis KA.

Figure 2:
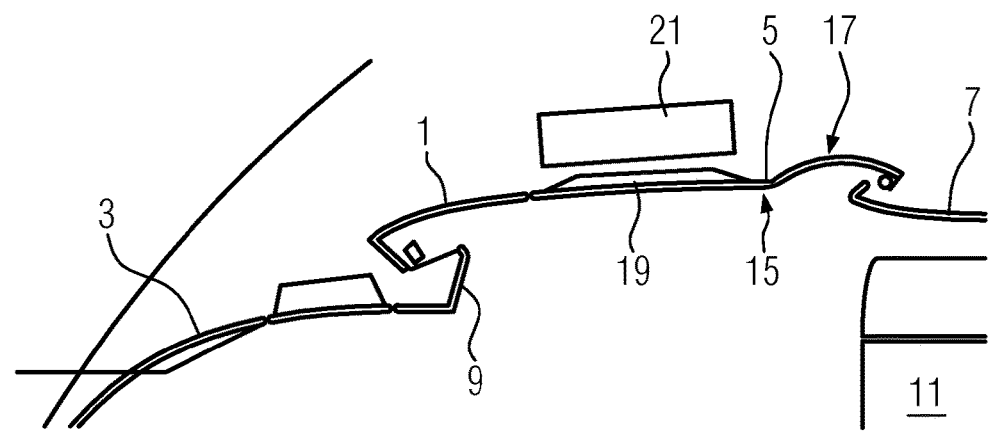
FIG. 2 shows part of the cross section from FIG. 2.

In this context, it is apparent from the enlarged illustration in FIG. 2, which shows the section of the interior trim arrangement which bounds the aircraft cabin arrangement in the upward direction, that the interior trim arrangement has a lateral ceiling element 1 which is arranged closest to a lateral section 3 which bounds the aircraft cabin arrangement in the lateral direction when viewed from the cabin axis KA.

The lateral ceiling element 1 is embodied in a curved fashion, and a central ceiling element 5 adjoins the lateral ceiling element 1 towards the cabin axis KA and is also arranged at the end, facing away from the lateral section 3, of the lateral ceiling element 1. On the side of the central ceiling element 5 facing away from the lateral ceiling element 1, a ceiling panel element 7 not described in more detail below is also provided in the upper region of the interior trim arrangement of the aircraft cabin.

The previously described arrangement composed of the lateral ceiling element 1, central ceiling element 5 and ceiling panel element 7 can preferably be arranged in the region of a door of an aircraft cabin arrangement, and can then extend in the axial direction of the cabin arrangement at the height of the door, transversely with respect to the cabin axis KA.

Provided underneath the lateral ceiling element 1 is preferably an angular element 9 which is provided with lighting elements pointing towards the interior of the cabin. In addition, a monument 11 can be provided in a preferred fashion underneath the central ceiling element 5 and the ceiling panel element 7, wherein this monument 11 can be, for example, a galley unit or a cupboard arrangement.

The central ceiling element 5 is embodied here as an exemplary embodiment of a ceiling trim element according to the subject matter disclosed herein. Here, the central ceiling element 5 has a planar panel element 13 which has a front side 15 which points towards the interior of the aircraft cabin and a rear side 17 which points away from the interior.

A recess 19 is formed in the panel element 13, and an image surface, which is embodied as a monitor 21, is mounted on a same side of the panel element as the rear side 17 of the panel element 13, at a distance from the panel element 13, which monitor is aligned towards the recess 19 and covers it. The monitor 21 can be, for example, a flat screen with background lighting, with the result that patterns or images can be displayed thereon, which patterns or images give rise in turn to complex lighting scenarios underneath the central ceiling element 5.

As is apparent from FIG. 3, which shows various exemplary embodiments of ceiling trim elements or central ceiling elements 5 according to the subject matter disclosed herein, the recess 19 is surrounded in each case by a lighting element 23, which is embodied in such a way that an illuminating ring is generated around the image surface or the monitor 21, wherein light is also emitted from below in the direction of the monitor 21 from the lighting element 23.

Figure 3:
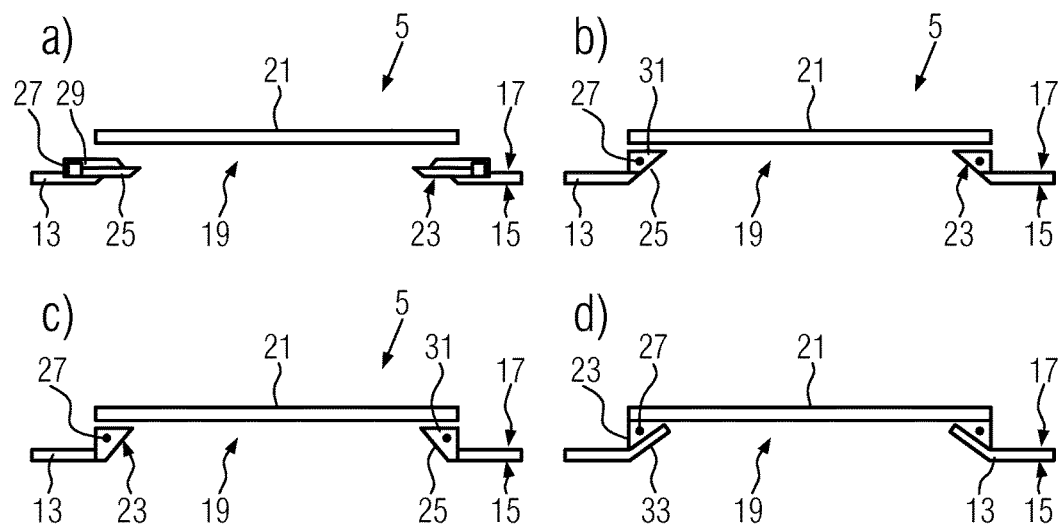
FIG. 3 shows various exemplary embodiments of the arrangement of the lighting element and image surface on a ceiling trim element according to the subject matter disclosed herein.

In the exemplary embodiment of the lighting element 23 which is shown in part a) of FIG. 3, the latter has a diffuser 25 which is embodied in an annular shape and rests against the rear side 17 of the panel element 15 and is arranged between the panel element 15 and the monitor 21. On the circumferential wall of the diffuser 25 pointing away from the recess 19, lighting sources 27 are mounted distributed around the recess 19, which lighting sources 27 irradiate into the diffuser element 25, with the result that scattered light propagates therein, exits in the downward direction and is emitted from the sections of the diffuser 25 which are not covered by the covering element 29 towards the monitor 21. In this way, the diffuser 25 constitutes the illuminating ring, and the edge region of the monitor 21 is illuminated from below, which gives a passenger standing underneath the central ceiling element 5 the impression that the monitor 21 is significantly further away from the panel element 13 than is actually the case.

In the exemplary embodiment of an inventive ceiling trim element or central ceiling element 5 which is illustrated in part b) of FIG. 3, the diffuser 25 is also embodied in an annular shape, wherein the internal surface of the diffuser 25 which points towards the recess 19 is embodied inclined towards an axis perpendicularly with respect to the recess 19. Furthermore, the diffuser 25 has cutouts 31 which are provided distributed around the recess 19 and in which in turn the lighting sources 27 are arranged, with the result that scattered light is generated in the diffuser 25 by the latter, which scattered light can be seen from below and which is also incident here from below on the monitor 21, as a result of which the effect which has already been described is also achieved.

In the case of the example of a ceiling trim element or central ceiling element 5 illustrated in part c) of FIG. 3, the diffuser 25 is arranged inside the recess 19, wherein the circumferential surface of the diffuser 25 which points radially outwards away from the center of the recess 19 rests flush against the edge of the recess 19 in the panel element 13. As a result, the diffuser 25 extends in the plane of the panel element 13 and can also be seen from below. In the case of this diffuser 25, cutouts 31 are also formed distributed therein around the recess 19, in which cutouts 31 lighting sources 27 are arranged which in turn generate scattered light in the diffuser 25. The scattered light is also additionally incident here from below from the diffuser 25 on the edge of the monitor 21.

In contrast to the exemplary embodiments of an inventive ceiling trim element or central ceiling element 5 which are described above, the exemplary embodiment which is presented in part d) of FIG. 3 does not have a diffuser. In this case, the edge region 33 of the panel element 13, which edge region 33 adjoins the recess 19, is inclined towards the monitor 21, wherein lighting sources 27 are provided adjacent to the edge region 33 and, sealed off behind the latter, which lighting sources 27 then illuminate the monitor 21 directly from below with the result that the illuminating ring is generated at the edge of the monitor 21. These lighting sources 27 are, however, not visible to passengers, with the result that the latter are not illuminated directly by them. It is advantageous here if the edge of the monitor 21 or the image surface is provided with a matt surface in order to generate scattered light in the edge region.

In these arrangements shown in FIG. 3, composed of a lighting element 23 and monitor 21 arranged above it, it is ensured in each case that an illuminating ring is generated. In addition, the monitor is illuminated from below. The illuminating ring gives passenger standing underneath it the impression that the monitor 21 is significantly further away from the front side 15 of the panel element 13 than is actually the case. This simple arrangement can therefore give an aesthetically advantageous impression.

Furthermore, the monitor 21 permits varying or moving patterns to be represented, which additionally permits complex lighting scenarios underneath the central ceiling element 5. On the other hand, a monitor such as, for example, an LCD or LED monitor is of comparatively flat design, with the result that the requirements made of the space required for it are low.

Figure 4:
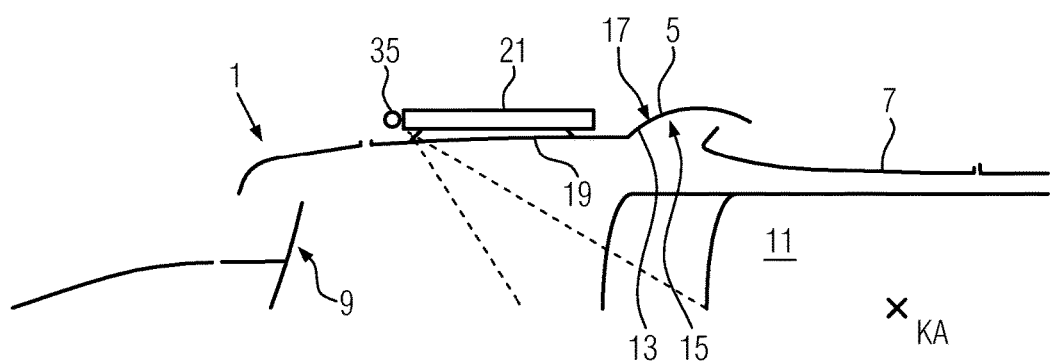
FIG. 4 shows a second preferred exemplary embodiment of a ceiling trim element according to the subject matter disclosed herein within an interior trim arrangement.

FIG. 4 illustrates a second exemplary embodiment of an interior trim arrangement, wherein a lateral ceiling element 1, a central ceiling element 5 and a ceiling panel element 7 are also provided here again adjacent to one another in the transverse direction perpendicularly with respect to the cabin axis KA.

In this case, the central ceiling element 5 is provided not only with a monitor 21, which is mounted above a recess 19, but also with an additional projector 35. A lighting element which generates an illuminating ring around the monitor 21 is also provided around the recess here even if not illustrated.

The projector 35 is also mounted adjacent to the rear side 17 of the panel element 13 of the central ceiling element 5, wherein the projector 35 is aligned in such a way that it can project a pattern onto a wall element of a monument 11 which is arranged underneath the ceiling panel element 7.

The concept of providing a projector 35 in a central ceiling element 5 is an independently inventive concept and can be used even without simultaneous arrangement of a monitor 21 above a recess 19 in a ceiling trim element of an aircraft cabin.

This arrangement of the projector 35 is associated with the advantage that passengers only move exceptionally into the beam path of the projector 35 towards the monument 11, with the result that the pattern projected thereon is disrupted only exceptionally. This arrangement can be used, in particular, to project, for example when boarding, specific information for the entering passengers onto the monument.

Figure 5:
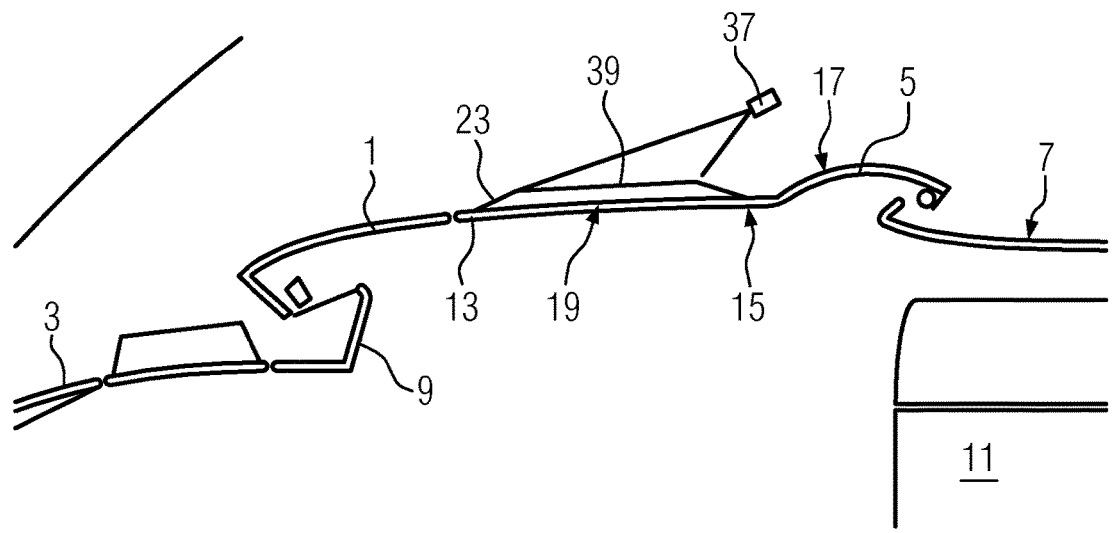
FIGS. 5 and 6 show further embodiments of ceiling trim elements according to the subject matter disclosed herein.

The exemplary embodiment illustrated in FIG. 5 of a central ceiling element 5 according to the subject matter disclosed herein has, instead of the monitor 21, a projector 37 on the rear side 17, which projector is configured to project varying images or patterns onto a projection surface 39 above a recess 19 which forms the image surface here. The recess 19 can also be surrounded here by a lighting element 23 with which the edge region 41 of the projection surface 39 is illuminated, with the result that the illuminating ring is generated as a result.

Figure 6:
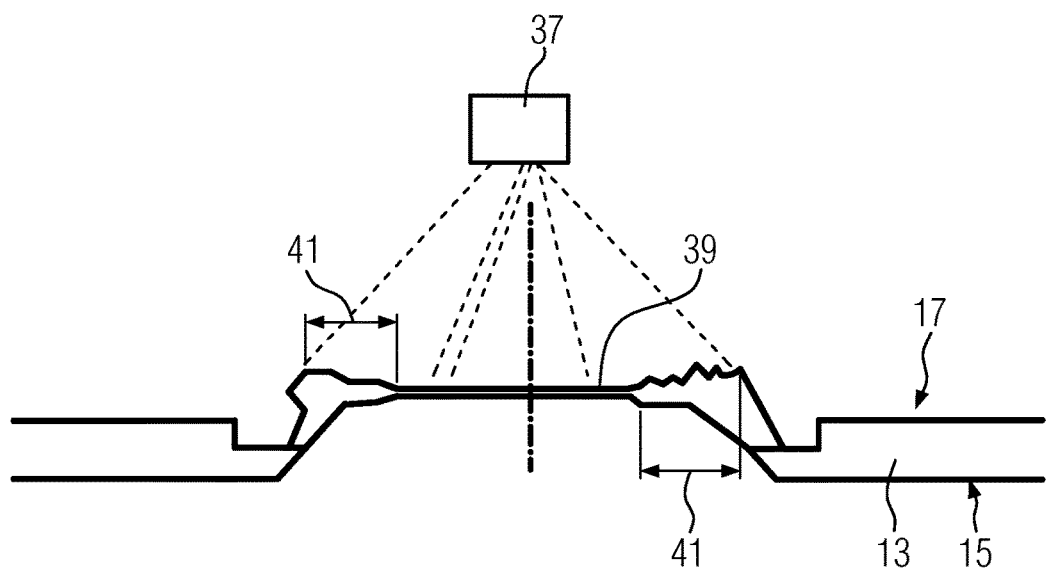

Alternatively it is also possible, as shown in FIG. 6, for the projector 37 to project a varying pattern onto the projection surface 39. In addition, the projector 37 simultaneously projects light onto an edge region 41 around the projection surface 39, wherein the pattern generated therein differs from that on the actual projection surface 39, with the result that the illuminating ring and the pattern are generated simultaneously by the projector 37.

With the inventive embodiment of a ceiling trim element or of a central ceiling element 5 it is possible to generate, in particular in the region of doors in an aircraft cabin, complex lighting conditions and simultaneously to give an aesthetically appealing impression to the passengers without it being necessary to make available a large space for this above the trim arrangement in the aircraft fuselage. If a projector together with a projection surface is used instead of the monitor 21, the position of the projector above the central ceiling element can be adapted in a way which permits the spatial conditions there. In particular, the projector can also be mounted laterally offset with respect to a central axis perpendicularly with respect to the recess.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A ceiling trim element for a passenger cabin of an aircraft cabin of an aircraft, the ceiling trim element comprising:
   a planar panel element comprising:
      a front side oriented to face towards an interior of the aircraft cabin;
      a rear side oriented to face away from the interior of the aircraft cabin; and
      a recess through a full thickness of the planar panel element;
   an image surface oriented towards the recess, the image surface being arranged on a same side of the planar panel element as the rear side, wherein a varying pattern generator is assigned to illuminate the image surface with varying patterns; and
   a lighting element that is arranged around the recess to generate an illuminating ring surrounding the image surface,
   wherein the lighting element comprises a diffuser, which has an annular shape that completely surrounds the recess and is arranged on the rear side of the planar panel element, between the planar panel element and the image surface, and
   wherein the lighting element is arranged such that scattered light generated in the diffuser illuminates an edge of the image surface, the edge of the image surface illuminated by the diffuser being configured to provide a passenger located underneath the image surface an impression that the image surface is located at a distance further away from the passenger than an actual distance between the passenger and the image surface.

2. The ceiling trim element according to claim 1, wherein the lighting element comprises a multiplicity of lighting sources, which are arranged around the recess.

3. The ceiling trim element according to claim 2, comprising a covering element covering at least a portion of the diffuser, wherein the lighting element is configured such that light from the multiplicity of light sources propagates through the diffuser, emitted from the diffuser in a downward direction, away from the image surface, and, from sections of the diffuser which are not covered by the covering element, towards the image surface.

4. The ceiling trim element according to claim 1, wherein a multiplicity of lighting sources are arranged on an outer circumferential surface of the diffuser and are configured to point away from the recess.

5. The ceiling trim element according to claim 1, wherein the diffuser comprises cutouts around the recess, in which cutouts the lighting sources are arranged.

6. The ceiling trim element according to claim 1, wherein the diffuser is arranged inside the recess.

7. The ceiling trim element according to claim 1, wherein an edge region of the planar panel element is inclined towards the rear side.

8. The ceiling trim element according to claim 1, wherein the image surface is a monitor.

9. An aircraft cabin arrangement for a passenger aircraft, which extends rectilinearly along a cabin axis, the aircraft cabin arrangement comprising:
   an interior trim arrangement, which is configured to form an outer wall of the aircraft cabin arrangement, at least in certain sections, and which comprises a lateral ceiling element, a central ceiling element, and a ceiling panel element,
   wherein the central ceiling element is a ceiling trim element according to claim 1,
   wherein the lateral ceiling element, the central ceiling element, and the ceiling panel element are part of a section of the outer wall which bounds the aircraft cabin arrangement in an upward direction, and
   wherein the lateral ceiling element, the central ceiling element, and the ceiling panel element are arranged adjacent to one another in a transverse direction with respect to the cabin axis, such that:
      the lateral ceiling element is arranged closest to a lateral section of the outer wall to bound the aircraft cabin arrangement in a lateral direction of the cabin axis,
      the central ceiling element is arranged on a side of the lateral ceiling element that faces away from the lateral section of the outer wall, and the ceiling panel element is arranged on a side of the central ceiling element that faces away from the lateral ceiling element.

10. The aircraft cabin arrangement according to claim 9, wherein:
    the aircraft cabin arrangement comprises at least one aisle oriented parallel to the cabin axis, and
    the central ceiling element is arranged above the at least one aisle in a vertical direction.

11. The ceiling trim element according to claim 1, wherein the image surface is spaced apart from the planar panel element in a direction orthogonal to a direction of extension of the image surface.

12. The ceiling trim element according to claim 1, wherein the image surface is not located within the recess.

* * * * *